(12) United States Patent
Amino et al.

(10) Patent No.: US 7,546,863 B2
(45) Date of Patent: Jun. 16, 2009

(54) PNEUMATIC TIRE WITH REINFORCEMENT RUBBER LAYER

(75) Inventors: Naoya Amino, Hiratsuka (JP); Katsunori Tanaka, Hiratsuka (JP); Atsushi Tanno, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 433 days.

(21) Appl. No.: 10/555,648

(22) PCT Filed: May 12, 2004

(86) PCT No.: PCT/JP2004/006377

§ 371 (c)(1),
(2), (4) Date: Nov. 4, 2005

(87) PCT Pub. No.: WO2004/113099

PCT Pub. Date: Dec. 29, 2004

(65) Prior Publication Data

US 2007/0000591 A1    Jan. 4, 2007

(30) Foreign Application Priority Data

Jun. 17, 2003    (JP) ............................. 2003-171961

(51) Int. Cl.
*B60C 1/00* (2006.01)
*B60C 13/00* (2006.01)
*B60C 15/06* (2006.01)

(52) U.S. Cl. .................. 152/541; 152/546; 152/547; 152/555

(58) Field of Classification Search ................ 152/458, 152/516, 517, 541–543, 546, 547, 555
See application file for complete search history.

(56) References Cited

U.S. PATENT DOCUMENTS

| | | | | |
|---|---|---|---|---|
| 3,406,733 A | * | 10/1968 | Boileau | 152/542 |
| 4,202,393 A | * | 5/1980 | Ikeda et al. | 152/546 X |
| 4,263,955 A | * | 4/1981 | Ikeda | 152/517 |
| 4,640,329 A | * | 2/1987 | Nakasaki et al. | 152/541 X |
| 4,757,850 A | * | 7/1988 | Nakasaki et al. | 152/546 X |
| 5,023,292 A | * | 6/1991 | Hong et al. | 152/547 X |
| 5,429,169 A | * | 7/1995 | Igarashi et al. | 152/546 X |

(Continued)

FOREIGN PATENT DOCUMENTS

JP    55-114606    9/1980

(Continued)

OTHER PUBLICATIONS

Kirk-Othmer Encyclopedia of Chemical Technology, 4th ed., vol. 21, John Wiley & Sons, New York, 1997, pp. 526-527.*

*Primary Examiner*—Adrienne C Johnstone
(74) *Attorney, Agent, or Firm*—Greer, Burns & Crain, Ltd.

(57) ABSTRACT

A pneumatic tire allowed to increase steering stability and durability while reducing rolling resistance, wherein a reinforced rubber layer extending from a bead part along a side wall part is installed in the side wall part. A rubber composition forming the reinforced rubber layer has a loss of tangent (tan δ) measured at 60° C. of 0.01 to 0.25, a JIS-A hardness measured at 23° C. of 70 to 95, and a breaking elongation in a tension test measured at 23° C. of 200% or more.

1 Claim, 1 Drawing Sheet

U.S. PATENT DOCUMENTS

| | | | | |
|---|---|---|---|---|
| 5,526,863 | A | * | 6/1996 | Hodges ................... 152/541 |
| 6,053,229 | A | * | 4/2000 | Suzuki ................... 152/541 |
| 2001/0051685 | A1 | * | 12/2001 | Obrecht et al. |
| 2002/0170642 | A1 | * | 11/2002 | Westermann et al. |

FOREIGN PATENT DOCUMENTS

| | | |
|---|---|---|
| JP | 01-101344 | 4/1989 |
| JP | 07-172117 | 7/1995 |
| JP | 08-318713 | 12/1996 |
| JP | 08-318714 | 12/1996 |
| JP | 09-300923 | 11/1997 |
| JP | 11-028916 | 2/1999 |
| JP | 11-286203 | 10/1999 |
| JP | 2001-071715 | 3/2001 |
| JP | 2001-123025 | 5/2001 |
| JP | 2002-012709 | 1/2002 |
| WO | WO-01/92039 A1 * | 12/2001 |
| WO | WO-02/10271 A2 * | 2/2002 |

* cited by examiner

PNEUMATIC TIRE WITH REINFORCEMENT RUBBER LAYER

TECHNICAL FIELD

The present invention relates to a pneumatic tire provided with a reinforcement rubber layer having a high degree of hardness, the reinforcement rubber layer extending from a bead portion along a sidewall portion. More specifically, the present invention relates to a pneumatic tire allowed to increase driving stability and durability while being allowed to reduce rolling resistance.

BACKGROUND ART

In a pneumatic tire, in order to exert excellent driving stability by improving casing stiffness, what is normally performed is to bury, inside a sidewall portion, a reinforcement rubber extending from a bead portion to the sidewall portion. However, if the sidewall portion is made thinner for the purpose of making a tire lighter, the reinforcement rubber layer has to be inevitably made thinner. As a result, that leads to a reduction in stiffness of the tire. To complement the reduction in stiffness of the type, it is required that the reinforcement rubber layer be arranged to reach the highest possible position. A variety of related arts for that purpose have been proposed (refer to Patent Documents 1 to 5, for example).

Patent Document 1: Japanese patent application Kokai publication No. Hei8-318713

Patent Document 2: Japanese patent application Kokai publication No. Hei8-318714

Patent Document 3: Japanese patent application Kokai publication No. Hei9-300923

Patent Document 4: Japanese patent application Kokai publication No. Hei11-28916

Patent Document 5: Japanese patent application Kokai publication No. 2001-71715

However, since a large amount of deformation occurs in a portion from a widest-width position of the tire to a shoulder portion of the tire when the tire is run, if rubber having a high degree of hardness, which has been conventionally used, is used as it is, there are such problems as: reduced durability of the tire, because of a small breaking elongation; and deteriorated rolling resistance, because of a large hysteresis loss.

DISCLOSURE OF THE INVENTION

An object of the present invention is to provide a pneumatic tire allowed to increase driving stability and durability while being allowed to reduce rolling resistance.

A pneumatic tire according to the present invention for achieving the above object is a pneumatic tire provided with a reinforcement rubber layer extending from a bead portion along a sidewall portion, inside the sidewall portion. The pneumatic tire is characterized in that a rubber composition forming the reinforcement rubber layer has a loss tangent (tan δ) of 0.01 to 0.25 when measured at a temperature of 60° C., a JIS-A hardness of 70 to 95 when measured at a temperature of 23° C., and a breaking elongation not less than 200% when measured at a temperature of 23° C. in a tensile test.

If physical properties of the reinforcement rubber layer extending from the bead portion along the sidewall portion are thus defined, it becomes possible to improve driving stability and durability while rolling resistance being reduced even in a case where the sidewall portion is made thinner for the purpose of making a tire lighter.

In the present invention, it is desirable that the reinforcement rubber layer extend from the bead portion along the sidewall portion, and beyond the widest-width position of the tire, reaches the shoulder portion of the tire. In addition, in order for the above physical properties to be exhibited, a rubber composition forming the reinforcement rubber layer is desired to be one formed in a manner that 20 to 120 weight parts of silica, and 0 to 60 weight parts of carbon black as an arbitrary element, are mixed with 100 weight parts of rubber.

BEST MODE FOR CARRYING OUT THE INVENTION

Figure 1:
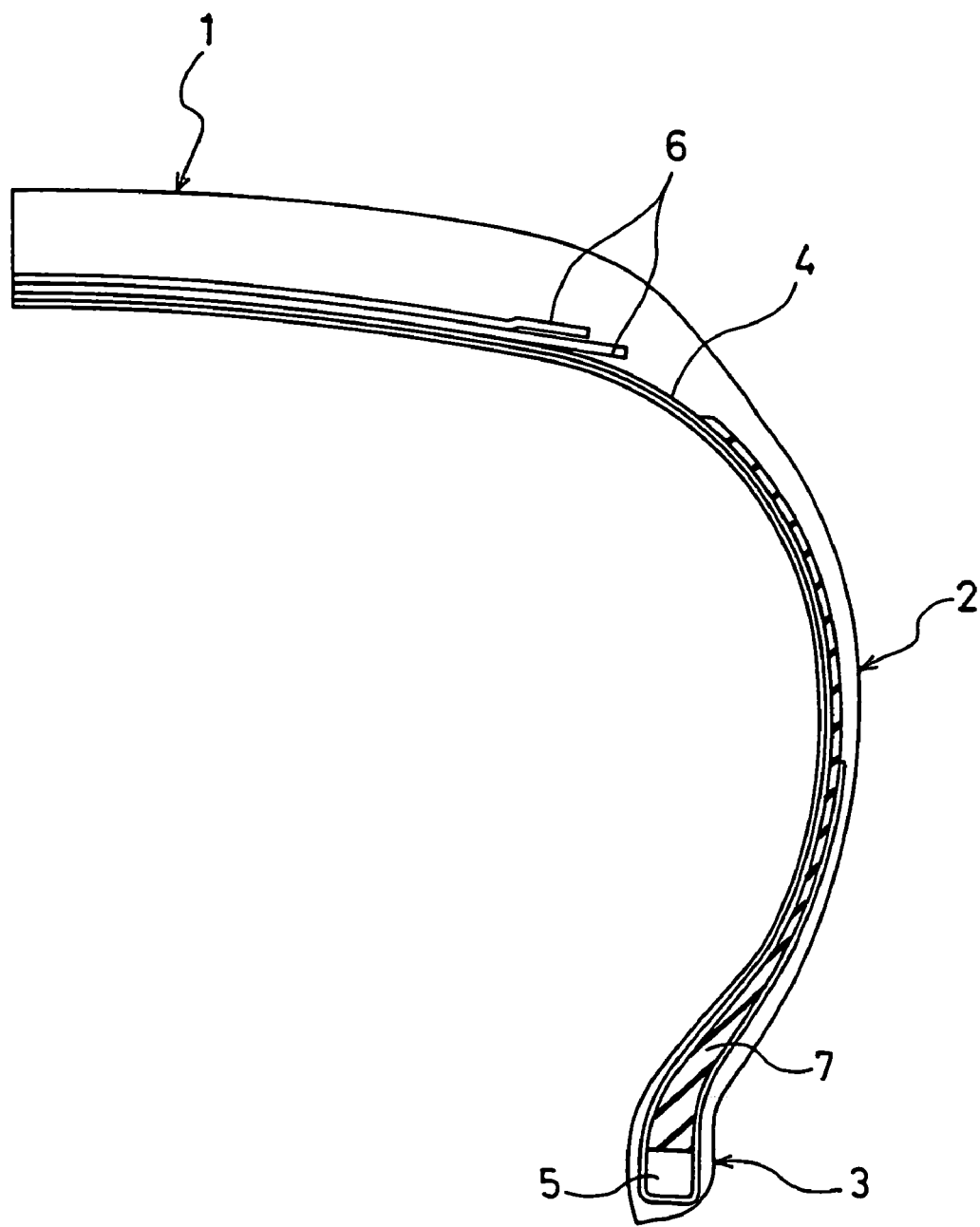
FIG. 1 is a half cross-sectional view taken along a meridian, showing a pneumatic tire according to an embodiment of the present invention.

Hereinafter, a detailed description will be given of a configuration of the present invention with reference to the attached drawings.

FIG. 1 shows a pneumatic tire according to an embodiment of the present invention. In FIG. 1, reference numerals 1, 2, and 3 respectively denote a tread portion, a sidewall portion, and a bead portion. A carcass layer 4 is mounted between a pair of the left and right bead portions 3, 3, and has an end portion folded back from the inside to the outside of the tire around a bead core 5. A plurality of belt layers 6, 6 are buried on the outer periphery of the carcass layer 4. These belt layers 6, 6 are arranged in order that cords of the respective belt layers can tilt to the circumferential direction of the tire and that the cords can cross one another between the layers.

Inside the sidewall portion 2, a reinforcement rubber layer 7 extending from the bead portion 3 along the sidewall portion 2 is buried, the reinforcement rubber layer 7 having a high degree of hardness. The reinforcement rubber layer 7 extends from the bead portion 3 along the sidewall portion 3, and beyond the widest-width position of the tire, reaches the shoulder portion of the tire. In the cross-sectional view along a meridian of the tire, the lowest-end part of the reinforcement rubber layer 7 forms a substantially triangular shape, the lowest-end part being relatively close to the bead portion. The highest-end part of the reinforcement rubber layer 7 has a uniform thickness which is thinner than the substantially triangular shape, the highest-end part being relatively close to the shoulder portion. That is, the reinforcement rubber layer 7 enables the sidewall portion 2 to be thinner while reinforcing the sidewall portion 2.

A rubber composition forming the above reinforcement rubber layer 7 has a loss tangent (tan δ) of 0.01 to 0.25 when measured at a temperature of 60° C., a JIS-A hardness of 70 to 95 when measured at a temperature of 23° C., and a breaking elongation not less than 200% when measured at a temperature of 23° C. in a tensile test.

As a rubber composition exhibiting the above physical properties, it is possible to adopt one formed in a manner that 20 to 120 weight parts of silica and 0 to 60 weight parts of carbon black are mixed with 100 weight parts of rubber. In a case where a mixed amount of silica is out of the above range, it is difficult to obtain the above physical properties. In a case where carbon black is additionally mixed, it becomes difficult to obtain the above physical properties if a mixed amount of carbon black exceeds 60 weight parts.

As silica, for example, dry method white carbon, wet method white carbon, colloidal silica, and precipitated silica can be cited. These kinds of silica may be used by one or in combination of two or more.

As base rubber, for example, natural rubber (NR), styrene-butadiene copolymer rubber (SBR) can be cited. These kinds of rubber may be used by one or in combination of two or more. Additionally, to the rubber composition thus obtained, in addition to silica and carbon black, a compounding agent used regularly may be added. As compounding agents, for example, process oil, a vulcanizer, a vulcanization accelerator, an antioxidant, and a plasticizer can be cited.

The pneumatic type configured as above is provided with the reinforcement rubber layer 7, which extends from the bead portion 3 along the sidewall portion 2, and beyond the widest-width position of the tire, reaches the shoulder portion of the tire, inside the sidewall portion 2. Therefore, even in a case where the sidewall portion 2 is made thinner for the purpose of making the tire lighter, casing stiffness of the tire is high and driving stability is excellent.

Furthermore, even though the tire assumes such a configuration that the reinforcement rubber layer 7 extends beyond the widest-width position of the tire and reaches the shoulder portion of the tire, since the reinforcement rubber layer 7 is formed by using rubber of a low loss tangent, rolling resistance of the tire can be reduced. In addition, since the rubber composition forming the reinforcement rubber layer 7 has a large breaking elongation, durability of the tire can be sufficiently satisfactory.

Here, the rubber composition forming the reinforcement rubber layer 7 is made to have a loss tangent (tan δ) of 0.01 to 0.25 at a temperature of 60° C., with the reasons being: that it is technically difficult to make it to have a loss tangent less than 0.01; and that rolling resistance is increased if the loss tangent exceeds 0.25. A more desirable range of the loss tangent is 0.07 to 0.25. Note that the loss tangent (tan δ) here is the one measured by using a viscoelastic spectrometer (manufactured by Toyo Seiki Seisaku-sho, Ltd.), with conditions of a frequency of 20 Hz, an initial distortion of 10%, and a dynamic distortion of plus or minus 2%.

Additionally, the rubber composition forming the reinforcement rubber layer 7 is made to have a JIS-A hardness of 70 to 95 when measured at a temperature of 23° C. This is because: if the JIS-A hardness is less than 70, a sufficient effect of improving driving stability cannot be obtained due to insufficient casing stiffness of the tire; and on the other hand, if the JIS-A hardness exceeds 95, riding comfort and durability are deteriorated.

Moreover, the rubber composition forming the reinforcement rubber layer 7 is made to have a breaking elongation not less than 200% when measured at a temperature of 23° C. in a tensile test. This is because if the breaking elongation is less than 200%, durability of the tire becomes insufficient. Although it is not required to particularly limit an upper limit of the breaking elongation, the upper limit is about 350% in reality. Note that the breaking elongation here is the one measured in compliance with JIS K6251.

In the aforementioned embodiment, the reinforcement rubber layer buried in the sidewall portion has a configuration where: its part relatively close to the bead portion assumes a substantially triangular shape, its part relatively close to the shoulder portion assumes a sheet-like shape, and the two foregoing parts continuously extend. In the present invention, however, it is not required to particularly limit cross-sectional shapes of the reinforcement rubber layer. Additionally, the part relatively close to the bead portion and the part relatively close to the shoulder portion may be separated. In the case they are separated, it is also possible that while the part relatively close to the bead portion is covered by a turned-up portion of the carcass layer, the part relatively close to the shoulder portion is arranged to the outside of the turned-up portion of the carcass layer.

While the detailed description has been given of the preferred embodiment of the present invention hereinabove, it should be understood that various modifications to, substitutions for, and replacements with the preferred embodiment can be carried out as long as the modifications to, the substitutions for, and the replacements do not depart from the spirit and the scope of the present invention defined by the attached claims.

Hereinbelow, descriptions will be given of results of experiment on pneumatic tires which were actually manufactured. First, as rubber compositions to form a bead filler, rubber compositions A to I respectively composed of blends shown in Table 1 below were prepared. Note that the rubber compositions A to I were prepared in the following manner. Rubber and a compounding agent such as carbon black are mixed for five minutes by using a Banbury mixer which is an internal mixer, and a vulcanization accelerator and sulfur are mixed, on an open roll mill, with the resultant of the foregoing mix.

TABLE 1

| | Rubber composition | | | | | | | | |
|---|---|---|---|---|---|---|---|---|---|
| | A | B | C | D | E | F | G | H | I |
| Natural rubber *1 | 70 | 70 | 70 | 70 | 70 | 70 | 70 | 70 | 70 |
| SBR *2 | 30 | 30 | 30 | 30 | 30 | 30 | 30 | 30 | 30 |
| Carbon black *3 | 90 | 60 | 50 | 70 | 55 | 40 | 50 | 60 | — |
| Silica *4 | — | — | 40 | 25 | 10 | 65 | 45 | 35 | 95 |
| Silane cuppling agent *5 | — | — | 4 | 2 | 1 | 6 | 4 | 3 | 9 |
| Zinc oxide *6 | 7 | 7 | 7 | 7 | 7 | 7 | 7 | 7 | 7 |
| Stearic acid *7 | 2 | 2 | 2 | 2 | 2 | 2 | 2 | 2 | 2 |
| Antioxidant *8 | 1 | 1 | 1 | 1 | 1 | 1 | 1 | 1 | 1 |
| Vulcanization accelerator *9 | 1.5 | 1.5 | 1.5 | 1.5 | 1.5 | 1.5 | 1.5 | 1.5 | 1.5 |
| Sulfur *10 | 7 | 7 | 7 | 5 | 7 | 5 | 5 | 5 | 5 |
| Loss tangent (tan δ) (at 60° C.) | 0.3 | 0.2 | 0.2 | 0.27 | 0.19 | 0.2 | 0.21 | 0.24 | 0.15 |

TABLE 1-continued

|  | Rubber composition | | | | | | | | |
|---|---|---|---|---|---|---|---|---|---|
|  | A | B | C | D | E | F | G | H | I |
| Degree of hardness (at 23° C.) | 85 | 68 | 85 | 85 | 70 | 95 | 85 | 86 | 85 |
| Breaking elongation (at 23° C.) | 180 | 250 | 190 | 210 | 208 | 200 | 203 | 213 | 220 |

In Table 1,
*1: RSS#3,
*2: Nipol 1502 manufactured by ZEON Corporation,
*3: DIA-HA manufactured by Mitsubishi Chemical Corporation
*4: Nipsil AQ manufactured by Nippon Silica Industrial
*5: Si-69 manufactured by Degussa AG
*6: Zinc oxide No. 3 manufactured by Seido Chemical Industry
*7: manufactured by NOF Corporation
*8: SANTOFLEX 6PPD manufactured by FLEXSIS
*9: Nocceler CZ manufactured by Ouchi Shinko Chemical Industrial
*10: manufactured by Karuizawa Refinery Here, pneumatic tires with a tire size of 205/65R17 were manufactured. The pneumatic tires were provided with the same structure except that different kinds of bead filler were used as a reinforcement rubber layer buried in the sidewall portion. In the conventional example, a filler height is set to be a normal height (45 mm from the highest end of the bead core in a radial direction of the tire). In the comparative examples 1 to 4 and in the examples 1 to 5, heights of filler (80 mm from the highest end of the bead core in a radial direction of the tire) is set to be higher than the normal height, and kinds of filler rubber are made different.

With regards to these test tires, rolling resistance, durability and casing stiffness are evaluated as follows, and the results thereof are shown in Table 2.

TABLE 2

|  | Conventional example | Comparative example 1 | Comparative example 2 | Comparative example 3 | Comparative example 4 | Example 1 | Example 2 | Example 3 | Example 4 | Example 5 |
|---|---|---|---|---|---|---|---|---|---|---|
| Filler height | Normal | High filler | High filler | High filler | High filler | High filler | High filler | High filler | High filler | High filler |
| Filler rubber | A | A | B | C | D | E | F | G | H | I |
| Rolling resistance | 100 | 125 | 95 | 94 | 103 | 93 | 92 | 94 | 100 | 90 |
| Durability | 100 | 90 | 105 | 95 | 105 | 104 | 101 | 102 | 105 | 108 |
| Casing stiffness | 100 | 110 | 105 | 115 | 115 | 110 | 130 | 115 | 115 | 115 |

Rolling Resistance:

Each of the test tires was mounted onto an wheel of a rim size of 15×6½ JJ, and rolling resistance thereof was measured by setting the tire in a state having an air pressure of 190 kPa, driven by a speed of 80 km/h, and having a load of 4.6 kN, by using a drum-type tire testing machine. Results of the assessment are shown in index numbers where a rolling resistance value of the conventional example is taken as 100. A higher value of the index number means that rolling resistance is higher.

Durability:

Each of the test tires was mounted onto an wheel of a rim size of 15×6½ JJ, and a mileage until the tire was destroyed was measured by setting the tire in a state having an air pressure was 190 kPa, driven by a speed of 80 km/h, and having a load as described below, by using a drum-type tire testing machine. The load was started with 88% of the maximum load and was increased by 13% each step. Note that one step corresponded to two hours until the load reached 140% of the maximum load, and to four hours after the load reached 140% of the maximum load. Results of the assessment are expressed in index numbers where a durability value of the conventional example is taken as 100. A higher value of the index number means that durability is more excellent.

Casing Stiffness:

A lateral spring constant of each of the test tires was measured. Results of the assessment are expressed in index numbers where a casing stiffness value of the conventional example is taken as 100. A higher value of the index number means that casing stiffness is higher, and therefore driving stability is more excellent.

As apparent from Table 2, in the comparative example 1, although casing stiffness was increased due to the bead filler higher than that of the conventional example, rolling resistance was increased and durability was reduced. In the comparative example 2, an effect of increasing the casing stiffness was insufficient as a result of an insufficient hardness of the rubber composition forming the bead filler. In the comparative example 3, durability was reduced as a result of an insufficient breaking elongation of the rubber composition forming the bead filler. In the comparative example 4, rolling resistance was increased as a result of a high loss tangent of the rubber composition forming the bead filler.

On the other hand, in all of the examples 1 to 5, since the respective rubber compositions forming the bead filler possess the required physical properties, it was possible that the casing stiffness was increased and the durability was improved while the rolling resistance was reduced.

INDUSTRIAL APPLICABILITY

This invention can be effectively used in the tire manufacturing industry, and additionally in the automobile manufacturing industry.

What is claimed is:

1. A pneumatic tire provided with a reinforcement rubber layer extending from a bead portion along a sidewall portion, inside the sidewall portion thereof, wherein:

a rubber composition forming the entire reinforcement rubber layer has a loss tangent (tan δ) of 0.01 to 0.25 when measured at a temperature of 60° C., a JIS-A hardness of 70 to 95 when measured at a temperature of 23° C., and a breaking elongation not less than 200% when measured at a temperature of 23° C. in a tensile test, the reinforcement rubber layer extends from a bead core at the bead portion along the sidewall portion, and beyond a widest-width position of the tire, and reaches a shoulder portion of the tire, the rubber composition forming the reinforcement rubber layer is one formed in a manner that 20 to 120 weight parts of silica, and 0 to 60 weight parts of carbon black are mixed with 100 weight parts of rubber, and the total of the weight parts of silica and carbon black in the rubber composition is between 65 and 105.

* * * * *